(12) United States Patent
Bloom

(10) Patent No.: US 8,656,267 B2
(45) Date of Patent: Feb. 18, 2014

(54) METHOD OF APPROXIMATE DOCUMENT GENERATION

(75) Inventor: Bard Bloom, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 1067 days.

(21) Appl. No.: 12/058,873

(22) Filed: Mar. 31, 2008

(65) Prior Publication Data
US 2009/0249181 A1   Oct. 1, 2009

(51) Int. Cl.
G06F 17/00  (2006.01)

(52) U.S. Cl.
USPC ............................ 715/209; 715/210; 715/229

(58) Field of Classification Search
USPC .......................................... 715/209, 210, 229
See application file for complete search history.

(56) References Cited

U.S. PATENT DOCUMENTS

| | | | | |
|---|---|---|---|---|
| 5,566,289 | A * | 10/1996 | Ikeo et al. | 715/235 |
| 5,608,857 | A * | 3/1997 | Ikeo et al. | 715/205 |
| 6,167,439 | A * | 12/2000 | Levine et al. | 709/217 |
| 6,650,343 | B1 * | 11/2003 | Fujita et al. | 715/760 |
| 6,941,262 | B1 * | 9/2005 | Kurzweil et al. | 704/9 |
| 7,243,300 | B1 * | 7/2007 | Metcalfe et al. | 715/201 |
| 7,331,038 | B1 * | 2/2008 | Snodgrass et al. | 717/123 |
| 2002/0133521 | A1 * | 9/2002 | Campbell et al. | 707/526 |
| 2002/0193695 | A1 * | 12/2002 | Koyrakh et al. | 600/510 |
| 2003/0018481 | A1 * | 1/2003 | Zhou et al. | 705/1 |
| 2003/0140053 | A1 * | 7/2003 | Vasey | 707/100 |
| 2004/0130751 | A1 * | 7/2004 | Hirtenreiter et al. | 358/1.18 |
| 2005/0154971 | A1 * | 7/2005 | Nagao | 715/500 |
| 2005/0203962 | A1 * | 9/2005 | Zhou et al. | 707/200 |
| 2005/0235203 | A1 * | 10/2005 | Undasan | 715/526 |
| 2005/0268230 | A1 * | 12/2005 | Bales | 715/530 |
| 2005/0278623 | A1 * | 12/2005 | Dehlinger et al. | 715/517 |
| 2005/0278625 | A1 * | 12/2005 | Wessling et al. | 715/527 |
| 2006/0123095 | A1 * | 6/2006 | Ten Kate et al. | 709/217 |
| 2006/0271835 | A1 * | 11/2006 | Marcy et al. | 715/500 |
| 2007/0002377 | A1 * | 1/2007 | Tokunaga | 358/1.18 |
| 2007/0150882 | A1 * | 6/2007 | Pena et al. | 717/168 |
| 2007/0204260 | A1 * | 8/2007 | Ishizuka | 717/162 |
| 2008/0133973 | A1 * | 6/2008 | Mizoe et al. | 714/37 |
| 2008/0199199 | A1 * | 8/2008 | Kato et al. | 399/81 |
| 2009/0043798 | A1 * | 2/2009 | Tan et al. | 707/102 |
| 2009/0077233 | A1 * | 3/2009 | Kurebayashi et al. | 709/224 |

* cited by examiner

*Primary Examiner* — Stephen Hong
*Assistant Examiner* — Marshon Robinson
(74) *Attorney, Agent, or Firm* — Scully, Scott, Murphy & Presser, P.C.; Daniel P. Morris, Esq.

(57) ABSTRACT

A method and system of approximate document generation, in one aspect, analyzes a document generation template, identifies one or more elements in the document generation template that have processing time that is longer than a threshold value and modifies said one or more elements identified as having processing time that is longer than a threshold value. One or more elements are modified so that the elements can terminate before completion of processing and produce at least a partial result and/or brief summary from processing of said one or more elements.

17 Claims, 2 Drawing Sheets

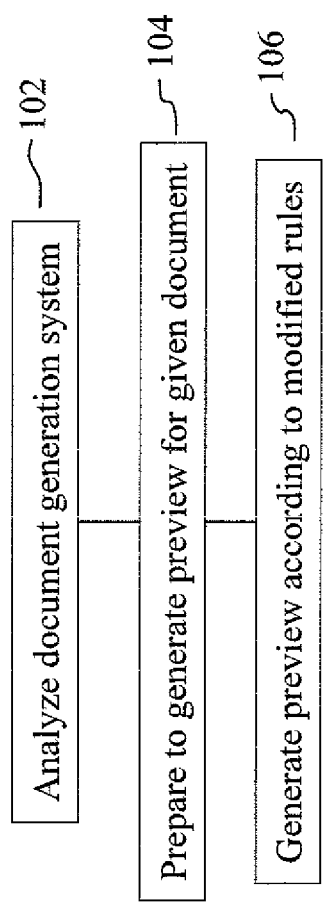

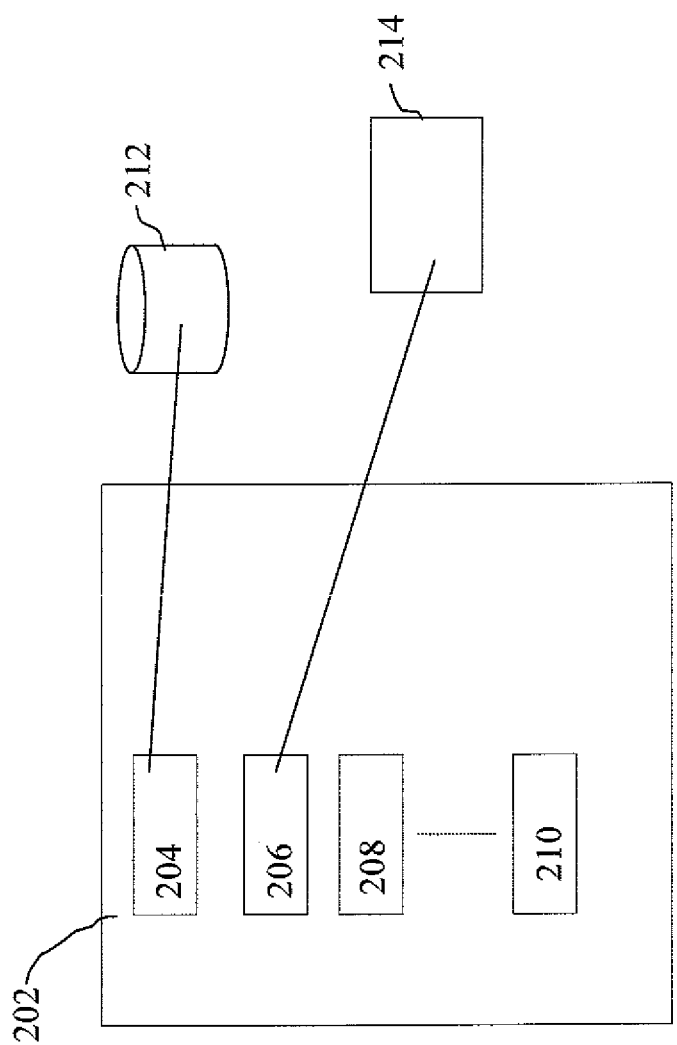

METHOD OF APPROXIMATE DOCUMENT GENERATION

FIELD OF THE INVENTION

The present disclosure relates to application development, and more particularly to approximating document generation.

BACKGROUND OF THE INVENTION

In advanced document generation, one starts with a template, which is, in effect, a program in a specialized language describing how a document is computed. The template will include two kinds of construct: text element concerned with formatting, boilerplate text, and the like; and control elements concerned with computing the content of the document. The control elements will often retrieve data from databases or remote web sites, perform arbitrary computations upon them, and, in general, do nearly anything that can be done in a general-purpose programming language. Crystal reports is an example of a known application that includes document generation.

Document generation can be quite slow. Sometimes this is unavoidable and is acceptable. For example, generating a phone book of the USA is going to take a while, and that is expected. Other times, the slow performance is unacceptable, and it would be desirable to at least show the progress. For example, it is often desirable to provide a preview of a document, even a little bit of it displayed so that the user can confirm that it shows the right kind of information formatted properly.

However, it is difficult in existing technology to get a preview: a user is either processing the template, which may take a long time, or not processing and also not getting a preview. It is also desirable that the document template has the code that behaves in the same manner whether in the preview mode or final generation of a document. Otherwise, it would be much harder to develop document templates and also make the preview process much less reliable and less useful. It is desirable that the preview document be generated from the same template as the full document albeit by different processing.

A document generation system can be thought of as an interpreter for a special-purpose programming language designed for generating documents. The language will, conceptually, have some commands for producing text (including formatting controls). As a simple example, the following command inserts the specified phrase into the document:

produce "The orders in the last month are:", and some other commands for manipulating the sources of data for the document. The following gets a list of all the orders in the last month, stores it in a variable ORDERS, and then iterates over the list of items.

```
let ORDERS = database-query (all orders in the last month);
for ORDER in ORDERS do
    produce ORDER.name;
```

The document that the above program would generate would look something like this: "The orders in the last month are: order-3113order-3114order-3115order-3116". In this disclosure, examples are given in an informal and generic document generation language for the sake of clarity. In actual systems, document generation languages vary considerably, and are usually easier to type and harder to read than the informal language. They, however, generally have similar core structures.

Document templates generally have a nested structure: important elements are conceptually and structurally inside of other important elements. For example, rather than simply spilling out the names of all the orders, a document template may have a structure like this.

```
let ORDERS = database-query (all orders in the last month);
let INCOME = 0;
produce "There were " + ORDERS.length + "orders in the last month. They were:";
produce "<ol>"; // Start an HTML-style Ordered List
for ORDER in ORDERS do
    produce "<li>"; // Start an HTML-style List Item in the Ordered List
    produce ORDER.name + ", price $" + ORDER.price;
    produce "</li>"; // End the List Item
    set INCOME = INCOME + ORDER.price
produce "<ol>"; // End the Ordered List
produce "And the net income was $" + INCOME;
```

This will produce the following HTML:
(full document HTML)
There were 4 orders in the last month. They were:

```
<ol>
<li>
order-3113, price $50
</li>
<li>
order-3114, price $150
</li>
<li>
order-3115, price $100
</li>
<li>
order-3116, price $200
</li>
</ol>
And the net income was $500
``` which appears as follows. The <ol>...|</ol> produce a numbered list, as follows: (full document sample)

There were 4 orders in the last month. They were:
1. order-3113, price $50
2. order-3114, price $150
3. order-3115, price $100
4. order-3116, price $200
And the net income was $500

In practice, the number of orders is likely to be far larger than 4, and the information to be presented is much more complex.

If one were to generate a preview of this document, an approximately-correct document that gives an idea of what the actual document will look like, the simplest way to get an approximate execution is to interrupt the program execution after a suitable time has elapsed. Suppose that the interruption came in the middle of the list. The produced HTML would look as follows: it is the full document HTML, chopped off in the middle.
(interrupted document HTML)
There were 4 orders in the last month. They were:

```
<ol>
<li>
```

-continued

```
    order-3113, price $50
    </li>
    <li>
    order-3114, price $150
    The output would, at best, look something like this:
    (interrupted document, rendered nicely)
```

There were 4 orders in the last month. They were:
  1. order-3113, price $50
  2. order-3114, price $150
Note that this document is inconsistent and incomplete. It says that there were four orders, but there are only two shown. The summary sentence is missing entirely.

In many cases, the output would be worse than what is shown above. The open tag <ol> is not matched by a closing tag </ol>, and a <li> is not matched by a closing </li>. Some existing browsers will refuse to render this, or otherwise trigger an error condition.
(interrupted document, rendered less nicely)
There were 4 orders in the last month. They were:
  1. order-3113, price $50
  2. order-3114, price $150
Error: Missing </li> tag in document.
Error: Missing </ol> tag in document.

This approximation is particularly pernicious. Not only is it inconsistent about the number of orders and missing the summary sentence, it has error messages about missing tags. Since those tags will actually be present in the full document, these error messages are wrong and present incorrect scenario. The natural reaction of the template-writer may be to insert new </li> and </ol> tags, however, since there are already </li> and </ol> tags in the document template, the new tags will cause the full document to be generated with malformed HTML. Such a preview is often worse than no preview at all.

BRIEF SUMMARY OF THE INVENTION

A method and system for approximate document generation are presented. The method in one aspect may comprise analyzing a document generation template, identifying one or more elements in the document generation template that have processing time that is longer than a threshold value, and modifying said one or more elements identified as having processing time that is longer than a threshold value. The modifying may include at least enabling said one or more elements to terminate before completion of processing of said one or more elements and establishing one or more new rules to produce at least a partial result from processing of said one or more elements.

A system for approximate document generation, in one aspect, may comprise a processor; means executable on the processor for analyzing a document generation template; means for identifying one or more elements in the document generation template that have processing time that is longer than a threshold value; means for modifying said one or more elements identified as having processing time that is longer than a threshold value. The modifying may include at least enabling said one or more elements to terminate before completion of processing of said one or more elements and establishing one or more new rules to produce at least a partial result from processing of said one or more elements. The means elements may include computer software, hardware, firmware, and/or electronic circuitry.

A program storage device readable by a machine, tangibly embodying a program of instructions executable by the machine to perform the above method of approximate document generation may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a flow diagram illustrating method of the present disclosure in embodiment.

FIG. 2 is a block diagram illustrating components of the present disclosure in one embodiment.

DETAILED DESCRIPTION

A method and system are provided that can terminate the processing of a template early, but do so in a manner that still produces results usable for a preview. A system or device of the present disclosure is herein also referred to as a terminator.

In one embodiment, the terminator or the method of the present disclosure may be invoked in the following circumstances:

Before the document generation is started, a system can be told, for example, to work for five seconds. This is particularly appropriate to preview generation: the preview will show up quickly, even if the document is long;

During document generation, when a "Stop Now" button is pushed. This is useful for preview if the timing option is not applied in advance: the user can stop the document generation and see the preview. It is also useful for generation of full documents, for example, in the case when the document is taking an unacceptably long time to be generated, to confirm that it is being done properly.

The method and system of the present disclosure may be implemented by analyzing and determining what parts of the document generation system take a long time, and revising them so that they can, at need, be stopped early on. Often, the slowness of document generation is entirely due to the control elements, and in many cases, a limited set of the control elements. For example, control elements such as database queries, long loops, and fetching items from web sites can take a long time. These time-consuming elements can be identified. In many cases, the processing of those elements, e.g., the application can be modified so that when it is time to terminate quickly, they stop quickly and produce an understandable approximation of their correct answer.

A database query that should produce a list of say, "All orders in the last month" can be modified so that when it is time to stop quickly, would produce e.g. "10 orders in the last month", or, if it has to stop immediately, an empty list, rather than all 268,425. In all cases it will produce a list containing only values of the right sort. Other parts of the template can compute with this list, giving answers, which usually have the right character.

Loops can stop after, for example, 10 iterations, or 0 if they have to stop as quickly as possible. As was the case for queries, this will let the previewer see what happens from the first part of the loop: e.g., the preview document will contain the list of the first ten items, rather than all 268,425. Some parts of the computation may be wrong, but they are internally consistent. For example, if the actual document that was produced after the completion of the processing should say, "There were 268,425 orders in March, and they were: [ . . . list of all 268,425 . . . ]", the terminated document might produce, "There were 10 orders in March, and they were: [ . . . list of those 10 . . . ]". This document could be produced either by limiting queries to 10 answers, loops to 10 iterations, or both. The numbers may be inaccurate, but the count agrees with the size of the list. This will help confirm that the document is being formed properly.

Information that should be fetched from web sites can, if total time spent is too large, be replaced by text such as "Information from web site XXX goes here", or such fairly indicative summary, which will at least confirm that the proper source is being accessed.

In one embodiment, those simple control elements such as "is this number bigger than that one?" and text elements such as "print this in bold" that are fast to execute, are executed as normal, since there may not be a great gain in speed to having the terminator skip these elements. In particular, the partial information fetched from databases will be subjected to the full and proper formatting, which is one of the things that previewing is used to check.

FIG. 1 is a flow diagram illustrating method of the present disclosure in embodiment. At 102, the document generation system is analyzed a priori to determine which elements are likely to be slow. This analysis can be done by theoretical methods (e.g., calls from the document generation system to other systems are potentially slow), or experimental (e.g., generating diagrams of a given type often takes a long time). At 104, the document generation system prepares to generate a preview for a particular document. Thresholds for how accurate (and thus how slow) the preview will be may be set at this point. This step will establish some modified document generation rules, e.g., "database accesses should be limited to 10 results". At 106, the document is generated in accordance with the modified generation rules.

FIG. 2 is a block diagram illustrating components of the present disclosure in one embodiment. One or more elements (204, 206, 208, 210) in document generation template or application 202 are analyzed to determine whether they take a long time to process. The one or more elements may include control elements, text elements or other elements. One or more control elements, for example, may be for querying a database 212 and/or accessing a web site 214. If it is determined that the one or more elements take a long time to process, those kinds of elements are modified to be able to quickly stop and produce at least a partial result. For example, new rules may be established for those elements to follow. In one embodiment, elements other than the control elements in the document generation template such as the text elements, may be analyzed also to determine whether they take a long time to process. Those elements that are determined to take too long may also be modified to stop quickly and produce at least a partial result.

For the following document template:

```
let ORDERS = database-query (all orders in the last month);
let INCOME = 0;
produce "There were " + ORDERS.length + "orders in the last month.
They were:";
produce "<ol>"; // Start an HTML-style Ordered List
for ORDER in ORDERS do
    produce "<li>"; // Start an HTML-style List Item in the Ordered List
    produce ORDER.name + ", price $" + ORDER.price;
    produce "</li>"; // End the List Item
    set INCOME = INCOME + ORDER.price
produce "<ol>"; // End the Ordered List
produce "And the net income was $" + INCOME;
``` the method and system of the present disclosure may produce the following approximate document upon interruption.

There were 2 orders in the last month. They were:

1. order-3113, price $50

2. order-3114, price $150

And the net income was $200

While the information in the above approximate document is not entirely correct, that is, some orders are missing, they are missing cleanly, that is, missing from the count, the list, and the net income. The underlying HTML is correct, with no missing tags.

The method and system of present disclosure thus are able to produce a good approximate document that is consistent. On looking at it, one can see that the number of items in the text matches the number in the list, and the total price in the summary sentence is the total of the individual prices. By looking at it, one can get a good sense of what the structure of the full document will be.

This approximate document may be considered as a good deal better than no preview at all, and far better than the one produced by brute force interruption of the program.

A method and system described provides a clean mechanism to stop or interrupt an element in a document generation application and to preview an approximate result or brief summary of that element's processing. Thus, a user may stop a processing element that may be considered as taking too much time, view the preview, and even continue to the next processing element in the document generation template.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A computer-implemented method of approximate document generation, comprising:
    analyzing a document generation template;
    identifying one or more elements in the document generation template that have processing time that is longer than a threshold value, the one or more elements comprising one or control elements in the document generation template comprising a database query, a loop, or fetching a command from a web site, or combinations thereof, execution of which produces text result;
    modifying executing of said one or more control elements identified as having processing time that is longer than a threshold value, said modifying including at least:
        enabling said one or more elements to terminate before completion of processing of said one or more elements; and
        establishing one or more new rules to produce at least a partial result from processing of said one or more elements,
    wherein the partial result of said text result is produced in response to a stop command received from a user during document generation processing performed via said document generation template, or in response to receiving a time limit for the document generation processing, or combinations thereof, and the partial result provides a preview or brief summary or combination of both, of corresponding one or more elements' processing and the text result's structure, wherein the partial result comprises content that is less than a full result that running of said one or more control elements to completion would produce.

2. The method of claim 1, wherein said one or more control elements comprises the database query, and the database query is performed to produce a specified number of items to meet the threshold value of the processing time.

3. The method of claim 1, wherein said one or more control elements comprises the loop, and the loop is modified to execute a specified number of iterations.

4. The method of claim 1, wherein said one or more control elements comprises the fetching a command from a web site, and the command to be fetched is replaced with a text that specified the web site.

5. The method of claim 1, wherein said one or more elements includes one or more text elements in the document generation template.

6. The method of claim 1, wherein said steps are performed before a document generation of said document generation template is started.

7. The method of claim 1, wherein said steps are performed in response to a command stopping document generation of said document generation template while in progress.

8. A system for approximate document generation, comprising:
    a processor;
    means executable on the processor for analyzing a document generation template;
    means for identifying one or more elements in the document generation template that have processing time that is longer than a threshold value, the one or more elements comprising one or control elements in the document generation template comprising a database query, a loop, or fetching a command from a web site, or combinations thereof, execution of which produces text result;
    means for modifying executing of said one or more control elements identified as having processing time that is longer than a threshold value, said modifying including at least:
        enabling said one or more elements to terminate before completion of processing of said one or more elements; and
        establishing one or more new rules to produce at least a partial result from processing of said one or more elements,
    wherein the partial result of said text result is produced in response to a stop command received from a user during document generation processing performed via said document generation template, or in response to receiving a time limit for the document generation processing, or combinations thereof, and the partial result provides a preview or brief summary or combination of both, of corresponding one or more elements' processing and the text result's structure, wherein the partial result comprises content that is less than a full result that running of said one or more control elements to completion would produce.

9. The system of claim 8, wherein said one or more control elements comprises the database query, and the database query is performed to produce a specified number of items to meet the threshold value of the processing time.

10. The system of claim 8, wherein said one or more control elements comprises the loop, and the loop is modified to execute a specified number of iterations.

11. The system of claim 8, wherein said one or more control elements comprises the fetching a command from a web site, and the command to be fetched is replaced with a text that specified the web site.

12. The system of claim 8, wherein said one or more elements includes one or more text elements in the document generation template.

13. A non-transitory computer readable medium comprising a program of instructions executable by a machine to perform a method of approximate document generation, the method comprising:
    analyzing a document generation template;
    identifying one or more elements in the document generation template that have processing time that is longer than a threshold value, the one or more elements comprising one or control elements in the document generation template comprising a database query, a loop, or fetching a command from a web site, or combinations thereof, execution of which produces text result;
    modifying executing of said one or more control elements identified as having processing time that is longer than a threshold value, said modifying including at least:
        enabling said one or more elements to terminate before completion of processing of said one or more elements; and
        establishing one or more new rules to produce at least a partial result from processing of said one or more elements,
    wherein the partial result of said text result is produced in response to a stop command received from a user during document generation processing performed via said document generation template, or in response to receiving a time limit for the document generation processing, or combinations thereof, and the partial result provides a preview or brief summary or combination of both, of corresponding one or more elements' processing and the text result's structure, wherein the partial result comprises content that is less than a full result that running of said one or more control elements to completion would produce.

14. The non-transitory computer readable medium of claim 13, wherein said one or more control elements comprises the database query, and the database query is performed to produce a specified number of items to meet the threshold value of the processing time.

15. The non-transitory computer readable medium of claim 13, wherein said one or more control elements comprises the loop, and the loop is modified to execute a specified number of iterations.

16. The non-transitory computer readable medium of claim 13, wherein said one or more control elements comprises the fetching a command from a web site, and the command to be fetched is replaced with a text that specified the web site.

17. The non-transitory computer readable medium of claim 13, wherein said one or more elements includes one or more text elements in the document generation template.

* * * * *